(12) United States Patent
Gil et al.

(10) Patent No.: US 7,490,699 B2
(45) Date of Patent: Feb. 17, 2009

(54) MECHANISM WITH LOAD SENSOR FOR OPERATING A BRAKE

(75) Inventors: Sergio Nieto Gil, Zaragoza (ES); Jaume Prat Terradas, Barcelona (ES)

(73) Assignee: Fico Cables, S.A., Barcelona (ES)

( * ) Notice: Subject to any disclaimer, the term of this patent is extended or adjusted under 35 U.S.C. 154(b) by 0 days.

(21) Appl. No.: 10/617,538

(22) Filed: Jul. 11, 2003
(Under 37 CFR 1.47)

(65) Prior Publication Data
US 2005/0115774 A1    Jun. 2, 2005

Related U.S. Application Data

(63) Continuation of application No. PCT/EP02/00596, filed on Jan. 22, 2002.

(30) Foreign Application Priority Data

Jan. 22, 2001    (DE)    ............... 101 02 685

(51) Int. Cl.
*F16D 65/14*    (2006.01)
(52) U.S. Cl. ................ 188/2 D; 188/162; 188/1.11 R
(58) Field of Classification Search .......... 188/2 D, 188/156, 162, 158, 1.11 R; 701/70; 74/501.5 R, 74/502.4; 303/20; 254/294; 73/862.391, 73/856
See application file for complete search history.

(56) References Cited

U.S. PATENT DOCUMENTS

| 5,180,038 | A | * | 1/1993 | Arnold et al. ............... 188/171 |
| 5,590,744 | A | | 1/1997 | Belmond |
| 6,213,259 | B1 | * | 4/2001 | Hanson et al. ............. 188/156 |
| 6,244,394 | B1 | * | 6/2001 | Gutierrez et al. ........... 188/72.8 |
| 6,533,082 | B2 | * | 3/2003 | Gill et al. .................... 188/156 |
| 2003/0066714 | A1 | * | 4/2003 | Flynn et al. ................ 188/2 D |
| 2003/0227010 | A1 | * | 12/2003 | Petrak ........................ 254/294 |

FOREIGN PATENT DOCUMENTS

| DE | 19829514 C2 | 2/2000 |
| EP | 0710595 A1 | 5/1996 |
| FR | 2597820 | 10/1987 |
| JP | 5-286424 | 11/1993 |
| JP | 07-002091 | 1/1995 |
| JP | 11-089169 | 3/1999 |
| JP | 2000-211485 | 8/2000 |
| WO | WO 98/56633 | 6/1998 |
| WO | WO 99/30939 | 12/1998 |
| WO | WO-9930940 A | 6/1999 |
| WO | PCT/EP02/00596 | 7/2002 |

* cited by examiner

*Primary Examiner*—Bradley T King
(74) *Attorney, Agent, or Firm*—Cooley Godward Kronish LLP

(57) ABSTRACT

The present invention relates to an opening mechanism (1) for at least one brake in particular a parking brake comprising an actuator (30), connected to at least one brake cable (60) and a load sensor (40) for determining the mechanical load of the at least one brake cable (60) wherein the mechanical load of the at least one brake cable (60) is determined via the actuator (30) and decoupled from the at least one brake cable (60). By the arrangement according to the present invention, a direct connection between the actuator (30) and the brake cable (60) is provided wherein the load sensor (40) does not work as a load transmission or a coupling component. This arrangement meets high security requirements even in case of a failure of the load sensor (40) since the function of the operating mechanism (1) is not affected or prevented thereby.

11 Claims, 6 Drawing Sheets

MECHANISM WITH LOAD SENSOR FOR OPERATING A BRAKE

PRIORITY

The present application a continuation of International Application No. PCT/EP02/00596 filed Jan. 22, 2002, entitled Mechanism with Load Sensor for Operating a Brake, which is incorporated herein by reference and which claims the benefit of German Application No. 10102685.4, filed Jan. 22, 2001,

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to an operating mechanism with load sensor for a brake, in particular, for a parking brake-system of vehicles, which is driven by an electric motor, which uniformly operates the brakes and which is supervised by means of a load sensor.

BACKGROUND OF THE INVENTION

Vehicles of different types mostly comprise two different braking systems. One of said braking system serves for reducing the velocity of the vehicle during driving and it is hydraulically or pneumatically operated, for example, via a pedal. The other braking system is used for securing the vehicle during parking. In this brake system, the brakes are mainly operated via brake cables which are set under tensile loads by means of different lever mechanisms in the vehicle compartment. These brakes are also designated as handbrakes or lever brakes.

The prior art provides different solutions of mechanisms for operating parking brakes which are driven either by hand or by foot. Since sometimes substantial forces are needed to operate the parking brake, it is often not applied in the needed extent so that the vehicle can roll away in the parked state. Thereby, a high security risk is generated in traffic. On the other hand, it is also inconvenient for the driver to apply the parking brake with a high effort. For this reason, mechanisms for operating a parking brake were developed which are driven by an electric motor.

Although, it is convenient for the driver to use a parking brake with an electric operating mechanism, the construction of the parking brake and of the operating mechanism has to be protected against potential mechanical overload conditions so that for instance a defect of the motor does not lead to a damage or a destruction of the system. In this context, the WO 98/56633 discloses an electric operating mechanism with load sensor for a parking brake. This arrangement consists of an electric motor for the operation of a setting unit which is used for tightening or releasing a brake cable of a brake. The brake cable is connected with a setting unit via a load sensor so that the force exerted by the setting unit is directly transmitted and determined by the load sensor. It is a substantial disadvantage in this arrangement that the force transmission from the setting unit to the brake cable is disconnected in case of a failure of said load sensor. Therefore, an operation of the brakes is no longer possible which leads to a high risk in traffic. Additionally, the production of said operating mechanism of the present parking brake is expensive due to its complex construction.

It is, therefore, the problem of the present invention to provide an operating mechanism for a brake the construction of which meets higher security requirements and which, even though, comprises a simple construction. It is a further problem of the operating mechanism of the brake to reduce the expenditure of maintenance due to a more compact arrangement of the single components.

SUMMARY OF THE INVENTION

The present invention solves the above problems by an operating mechanism particularly for a parking brake as defined in claims 1 and 15. Further features are included in the dependent claims which separately or in combination represent preferred embodiments.

The mechanism for operating at least one brake, in particular a parking brake, according to the present invention comprises an actuator connected to at least one brake cable and a load sensor for determining the mechanical load of the at least one brake cable wherein the mechanical load of the at least one brake cable is determined via the actuator in a manner decoupled from the at least one brake cable.

According to its broadest concept, however, the above defined operating mechanism may be also used without using the load sensor. Alternatively, other technical arrangements for the load evaluation may be used which can be placed somewhere in the brake system to prevent damage or mechanical overload. This applies also for the embodiment according to claim 15.

For actuating at least one brake cable, mechanical, hydraulical, pneumatical, or piezoelectric actuators or combinations thereof can be used. While the brake cables are mostly loaded with tensile loads, it is necessary to supervise this mechanical load by means of a load sensor in order to identify the operating condition of the operated brakes and possible overload conditions of the brake cables and of the operating mechanism. To meet higher security requirements, the actuator is directly connected to the brake cable and the mechanical loading of the brake cable is determined via the actuator. Thereby, the force generated by the actuator is not directly transmitted to the brake cable via the load sensor. In case of a failure of the load sensor, the operation of the brakes by the operating mechanism is not affected and, thus, the necessary security is assured, for instance, in traffic.

The actuator of the present invention changes its position in direction of its longitudinal axis dependent on the mechanical load of the at least one brake cable.

It is the advantage of the present invention that the actuator can carry out a rotation as well as a linear movement. While the rotation is used for operating the actuator, the linear position change can be used for a determination of the load-dependent on the mechanical loading of the brake cables. To this end, for example, a displacement signal is generated which is calibrated on the mechanical load of the brake cables.

The actuator of the operating mechanism is driven by an electric motor via a gear wherein the actuator comprises a gear wheel, a spindle and a nut.

According to the present invention, preferably, a mechanical actuator is used which changes its length driven by an electric motor. Thereby, the connected brake cables are actuated and the brakes are operated. The change in length results from a rotating spindle by screwing the nut off the spindle or on the spindle.

Furthermore, a first end of said spindle being complementary shaped to a concentric, profiled opening of said gear wheel and being guided therein so that a rotation of the gear wheel is transmitted to said spindle and that at the same time a displacement of said first end of said spindle is possible in axial direction within said concentric, profiled opening of said gear wheel.

Usually, the acting mechanical loads are indirectly determined via a displacement. Based on the configuration of the first end of the spindle and the opening of the gear wheel according to the present invention, the displacement being necessary for determining the load is carried out by the spindle. As a consequence, the load sensor must no longer be directly integrated in the load transmission from the actuator to the brakes. This arrangement provides improved security which is based on a direct load transmission and a simplified arrangement. In spite of the occurring displacement, the transmission of the rotation of the spindle is not affected since the first end of the spindle is guided in a profiled opening of the gear wheel. Additionally, a stopper is arranged at the first end of the spindle so that the first end of the spindle cannot be completely removed from the gear wheel.

A rotation-decoupled stopper is mounted at a second end of the spindle. This rotation-decoupled stopper comprises a magnet fixing with a magnet. A Hall-chip in a Hall-chip fixing is arranged opposite of and spaced apart from said magnet wherein a spring is positioned between said magnet fixing and said Hall-chip fixing.

A load sensor is arranged near the second end of the spindle which is comprised of a Hall-chip and a magnet mounted in an appropriate way, respectively. The distance between the magnet and the Hall-chip is changed by the displacement of the spindle whereby an electric signal is generated in the Hall-chip due to a varying magnetic field. The displacement is carried out against the force of a spring having known characteristics which is clamped between the rotation-decoupled stopper and the Hall-chip fixing and which provides reference values for the loading of the at least one brake cable.

According to a preferred embodiment of the present invention, the nut comprises a respective inside thread to be guided on a thread of said spindle. Additionally, two Bowden cables are coupled to said nut via coupling facilities being symmetrically arranged to the spindle wherein the Bowden cables are connected to the at least one brake cable.

Due to the configuration of the nut according to the invention, the operation of the connected brake cable is enabled. Furthermore, a symmetrically load distribution on two Bowden cables takes place inside the operating mechanism which realizes an increased operation security of the operating mechanism.

According to a further embodiment of the present invention, the nut is configured as a coupling mechanism comprising a nut with an arc-shaped outer surface and a movable lever mounted thereon. The movable lever comprises coupling facilities for at least two brake cables so that at least two brakes can be directly operated via said actuator.

On the one hand, the said coupling mechanism forms a necessary component of the actuator since it is guided on the spindle and changes its positions in the same way as the nut. Furthermore, the coupling mechanism uniformly distributes the loads on the at least two connected brake cables via the movable lever. Thus, different strains of the brake cables as well as tolerances in the length adjustment of the brake cables are equalized by a simple arrangement.

Furthermore, the operating mechanism comprises microswitches being arranged along the spindle or parallel to said spindle on said housing which are switched by said nut or by the coupling mechanism and thereby generate a signal which indicates that maintenance has to be carried out. Dependent on the wear of the brakes, the brake cables have to be actuated in a different degree to generate the same braking effect. Accordingly, the nut or the coupling mechanism is screwed on the spindle to different positions in direction of the gear wheel. If the nut or the coupling mechanism reaches a given position on the spindle, a microswitch is operated. Thereby, a respective signal is generated which, for instance, informs the driver to see the garage in order to carry out maintenance work.

A further preferred embodiment of the present invention relates to an operating mechanism for at least one brake, particularly a parking brake, comprising an actuator having a spindle connected to at least one brake cable, and a load sensor for determining the mechanical loading of the at least one brake cable characterized in that said spindle is load controlled axially displaceable whereby the mechanical loading is uniformly distributed between the at least one brake cable and a second brake cable via said load controlled spindle displacement.

Based on the further preferred embodiment of an operating mechanism of the present invention, it is guaranteed that at the same time at least two brake cables connected to the actuator can be operated. The load applied by the operating mechanism is uniformly distributed to the connected brake cables. Therefrom, the advantage follows that a further technical assembly for realizing a uniform load distribution can be saved. Further, the whole operating mechanism consists of a few parts which do not require high efforts in maintenance. The loading of the operating mechanism as well as of the brake cables connected to the actuator are controlled by means of a load sensor. Since the load is uniformly distributed to the brake cables, one load sensor is completely sufficient.

According to a further preferred embodiment of the present invention, said actuator comprises said axially displaceable spindle with a thread and a nut for mounting the at least one brake cable guided thereon. Said spindle is driven by an electric motor via a gear with at least one gear wheel.

Preferably according to the invention, said actuator of the present invention is simply configured. The axially displaceable spindle and the nut as main components of the actuator guarantee that the actuator can vary its length dependent on the transmitted rotation. By means of this length variation, connected brake cables are actuated and, thus, the connected brakes are uniformly operated. In this case, the rotation is generated by an electric motor and it is transmitted by means of the gear to the actuator.

Preferably according to the invention, said spindle comprises a guiding portion complementary shaped to a concentric profiled opening of the gear wheel. Said spindle is guided in such a way in said concentric profiled opening of the gear wheel that a rotation of the gear wheel is transmitted to said spindle and at the same time a displacement of the guiding portion of said spindle is enabled in axial direction of the spindle within the concentric profiled opening of the gear wheel.

Based on the construction of the spindle and the gear wheel, the transformation of a rotation in a linear motion is achieved. In this context, it is advantageous that said gear wheel and the spindle are positively connected which allows a rotation of the spindle with said gear wheel while at the same time an axial displacement of the spindle in said gear wheel is possible.

Preferably according to the invention, the positive connection between the spindle and the concentric opening of the gear wheel is realized in such a way that the guiding portion of the spindle comprises a rib and said gear wheel comprises a recess complementary shaped to said rib inside the concentric opening.

In this context, it is also conceivable that said rib is configured within the concentric opening of the gear wheel. Further, profiled openings of the gear wheel as well as profiled guiding portions as, for example, angular guiding portions are conceivable.

According to a further preferred embodiment of the present invention, the second brake cable is mounted on the guiding portion of the spindle. Additionally, the thread of the spindle is limited by a stopper so that the nut cannot be screwed from the spindle via rotation of the spindle.

According to a further preferred embodiment, said load sensor is connected to the spindle in order to determine the mechanical loading of the brake cables connected to the actuator.

According to a further preferred embodiment of the present invention, said operating mechanism comprises a housing with at least one displacement portion in which the nut is guided and displaced and by which the rotation of the nut is prevented.

A length variation of the actuator is only possible by the supplied rotation in case the nut can be screwed on or from the spindle. Because of this reason, the rotation of the nut has to be prevented which is realized by the displacement portions in the housing of the operating mechanism. These displacement portions in the housing fix the nut so that only a displacement of the nut in axial direction of the spindle is realized. Therefore, the spindle can be screwed in the nut whereby the actuator shortens or whereby a mechanical tensile load is transmitted to the brake cables connected to the actuator. At the same time, this mechanical load is uniformly distributed to the connected brake cables since the spindle is freely displaceable within the concentric opening of the gear wheel.

BRIEF DESCRIPTION OF THE DRAWINGS

In the following detailed description the presently preferred embodiments of the present invention are described with reference to the drawings, the show.

DETAILED DESCRIPTION

Figure 1:
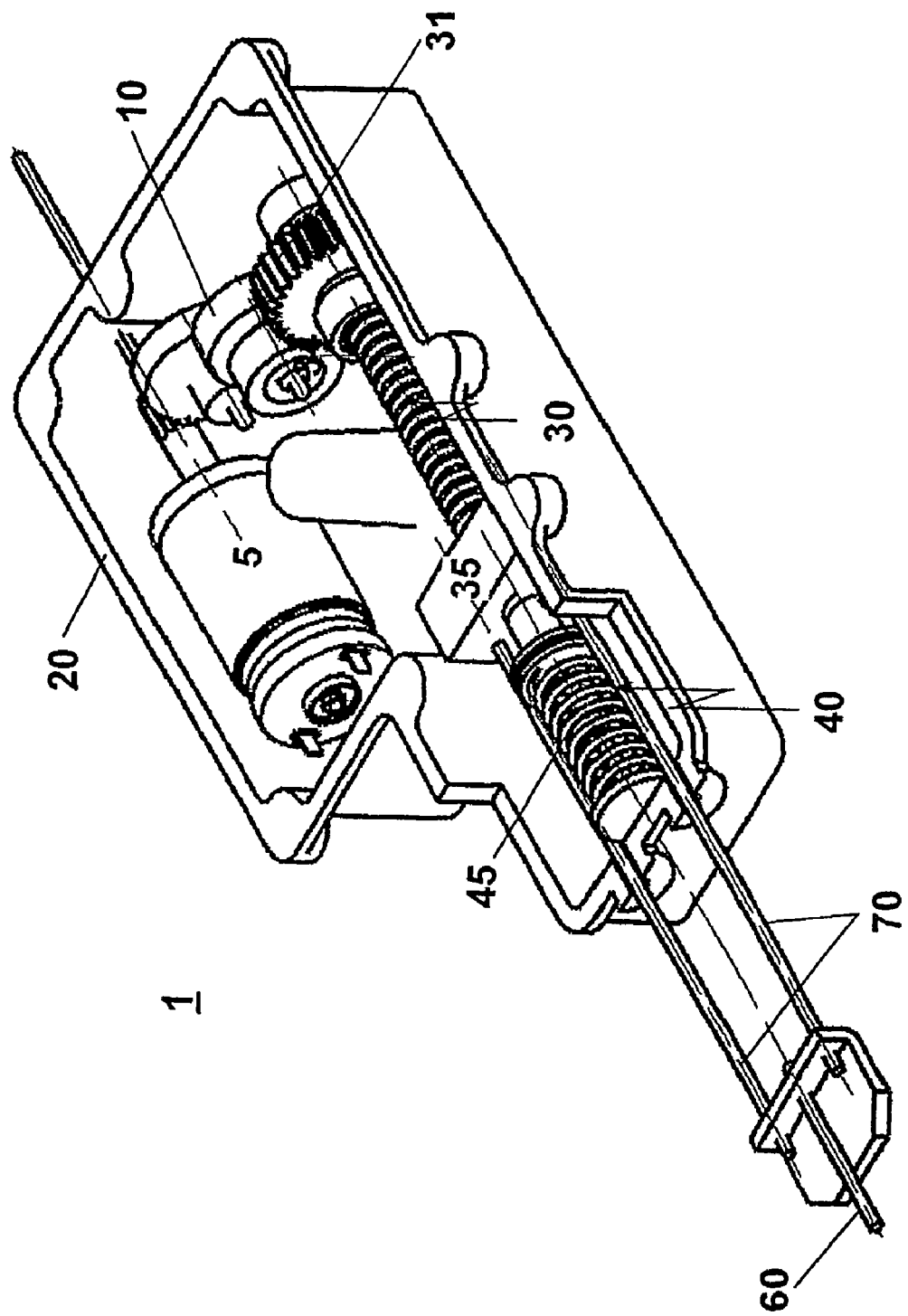
FIG. 1 a perspective general view of the inventive electric operating mechanism according to a first preferred embodiment of the invention.

A first preferred embodiment of the present invention is shown in FIG. 1 in a general view. The operating mechanism 1 for a parking brake contained in a housing 20 comprises as main components an electric motor 5, a gear 10, an actuator 30 and a load sensor 40. The operating mechanism 1 according to the invention can also be used for operating other brake systems than the parking brake. This requires that the signals provided by the load sensor 40 are correspondingly fast evaluated so that the operating mechanism 1 is controlled based on the signal evaluation. The housing 20 serves for the accommodation of the different components of the operating mechanism 1 which are thereby protected against outer influences as, for instance, humidity and mechanical impacts. Thereby, the efforts of maintenance of the operating mechanism 1 are reduced since the damage, for example, by corrosion is minimized.

The actuator 30 serves for the operation of the brake cables which lead to the respective brakes, for instance, the brakes of the rear wheels. According to a first preferred embodiment of the present invention, the actuator 30 forms a mechanical system which will be described in detail below. As a further solution for an actuator, for instance, hydraulic, pneumatic and piezoelectric systems or combinations thereof are conceivable as long as their performed changes in length are sufficient for operating the respective brake cables.

The mechanical actuator 30 shown in FIG. 1 is driven by an electric motor 5 via a gear 10. The gear 10 serves for an optimal force transmission from the electric motor 5 to the actuator 30 and protects at the same time the electric motor 5 against a mechanical overload.

The load sensor 40 serves for the determination of the mechanical load of the at least one brake cable 60 which is operated via the actuator 30. The load sensor 40 fulfills different functions. On the one hand, it serves for the permanent supervision of the mechanical load of the brake cable 60 in order to provide a reference signal for the condition of the operated brakes (not shown). This information is especially appropriate if the operating mechanism 1 is also used for the braking during the drive. In cooperation with other systems, thereby for instance, a locking of wheels is prevented in case of a full brake application and the optimal velocity reduction of the vehicle is enabled. Furthermore, a mechanical overload condition of the operating mechanism 1 and the brake cable 60 is indicated by the signal generated by the load sensor 40 so that possible damages or a destruction of the system can be prevented. The load determination is indirectly executed via the compression of a spring 45 as described in detail below. In connection with the actuator 30, however, other systems are also conceivable which, for example, are based on the piezo-electric effect or which uses the resistance or capacity change due to length variation.

Figure 2:
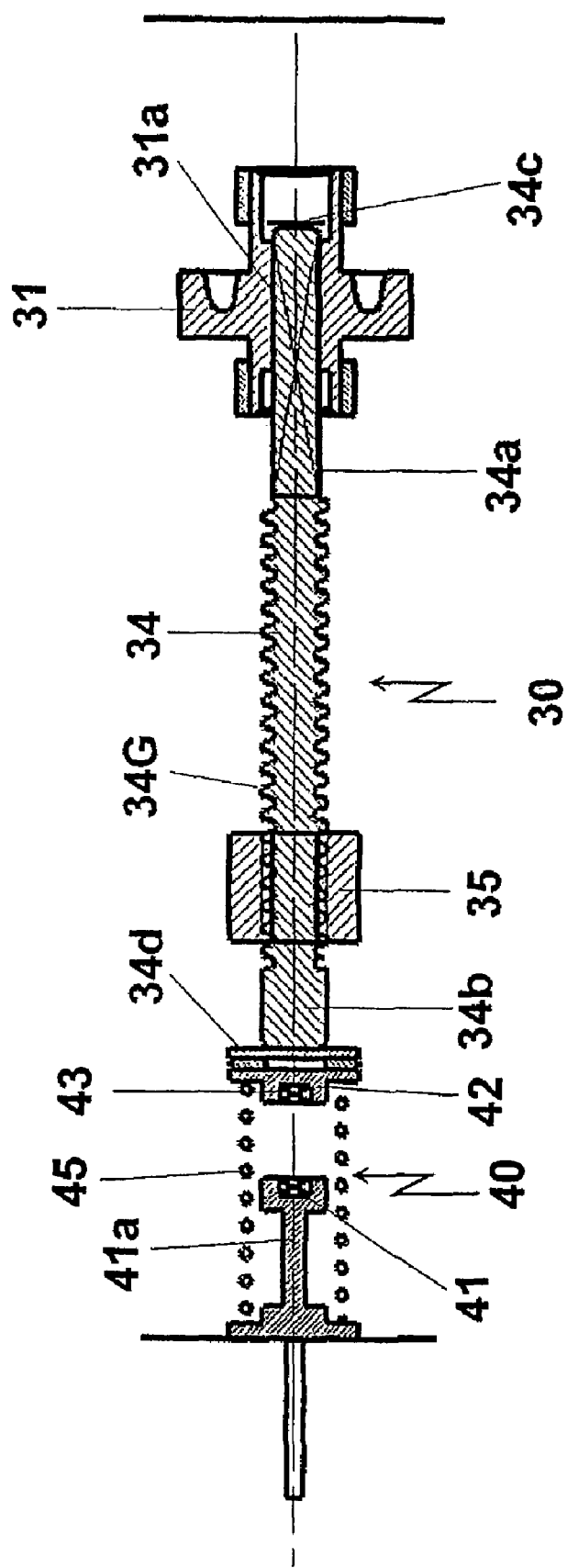
FIG. 2 a sectional drawing of the preferred actuator with load sensor.

FIG. 2 shows a sectional view of a first preferred embodiment of the present invention for a detailed illustration of the actuator 30 with load sensor 40. The actuator 30 is connected with a gear 10 via a gear wheel 31 so that the rotation of the electric motor 5 is thereby transmitted to the actuator 30. The gear wheel 31 comprises a profiled concentric opening 31a for receiving a first end 34a of the spindle 34. The opening 31a is preferably complementary shaped to the first end 34a of the spindle 34 wherein the first end 34a of the spindle 34 is shaped so that at the same time a transmission of the rotation of the gear wheel 31 to the spindle 34 is enabled and a displacement of the spindle 34 in axial direction within the profiled concentric opening 31a of the gear wheel 31. For instance, a trihedral or a square profile are a conceivable profile of the first end 34a of the spindle 34. Furthermore, the spindle 34 comprises a stopper 34c at its outer first end 34a which prevents a pulling out of the spindle 34 of the opening 31a of the gear wheel 31. Additionally, the spindle 34 comprises a thread 34G in its center part guiding a nut 35 with a complementary inside thread. A plate-like stopper 34d is mounted on the second end 34b of the spindle 34. This plate-like stopper 34d is decoupled from the rotation of the spindle 34 by its bearing and serves for the support of the spring 45 of the load sensor 40 against the force of which the at least one brake cable 60 is loaded.

As already mentioned above, the nut 35 is guided on the spindle 34. Since the rotation of the nut 35 is prevented, its axial position is changed in correspondence to the rotation of the spindle 34. As a consequence, the nut 35 is screwed on or screwed off the spindle 34. In this manner, the actuator 30 is shortened or elongated and the brake cable 60 as well as the respective brakes (not shown) are operated. As shown in FIG. 1 according to a first preferred embodiment of the present invention, the mechanical load is transmitted starting from the nut 35 via two Bowden cables 70 to the at least one brake cable 60. Based on this inventive arrangement, the mechanical loads are uniformly distributed on the nut 35. Additionally, this arrangement meets increased security requirements since in case of a failure of one Bowden cable 70 the operating mechanism 1 can still operate. Additionally, based on the inventive arrangement, the brakes can be further operated via the operating mechanism 1 even in case of a failure of the load sensor 40. The load is directly transmitted from the nut 35 to the brake cable 60 whereas the load sensor 40 does not work as a coupling or a load transmission component.

For operating the brakes (not shown) via the inventive operating mechanism 1, the spindle 34 is in such a way rotated by means of the gear wheel 31 that the nut 34 changes its axial position in the direction of the gear wheel 31. Due to this position change, the at least one brake cable 60 being directly or indirectly mounted on the nut 35 is applied since the actuator 30 is shortened. The mechanical tensile load of the at least one brake cable 60 is applied against the force of the spring 45 of the load sensor 40 so that the spring 45 is accordingly compressed. The length change of the spring 45 due to the compression is only possible since the spindle 34 can be displaced in axial direction within the opening 31a of the gear wheel 31. The maximum axial displacement of the spindle 34 in direction of the load sensor 40 is limited by the stopper 34c. It is assured by this stopper 34c that in case of a failure of the load sensor 40 the spindle 34 is nevertheless kept in the opening 31a of the gear wheel 31 and thereby an operating of the brakes via the operating mechanism 1 is possible.

Figure 3:
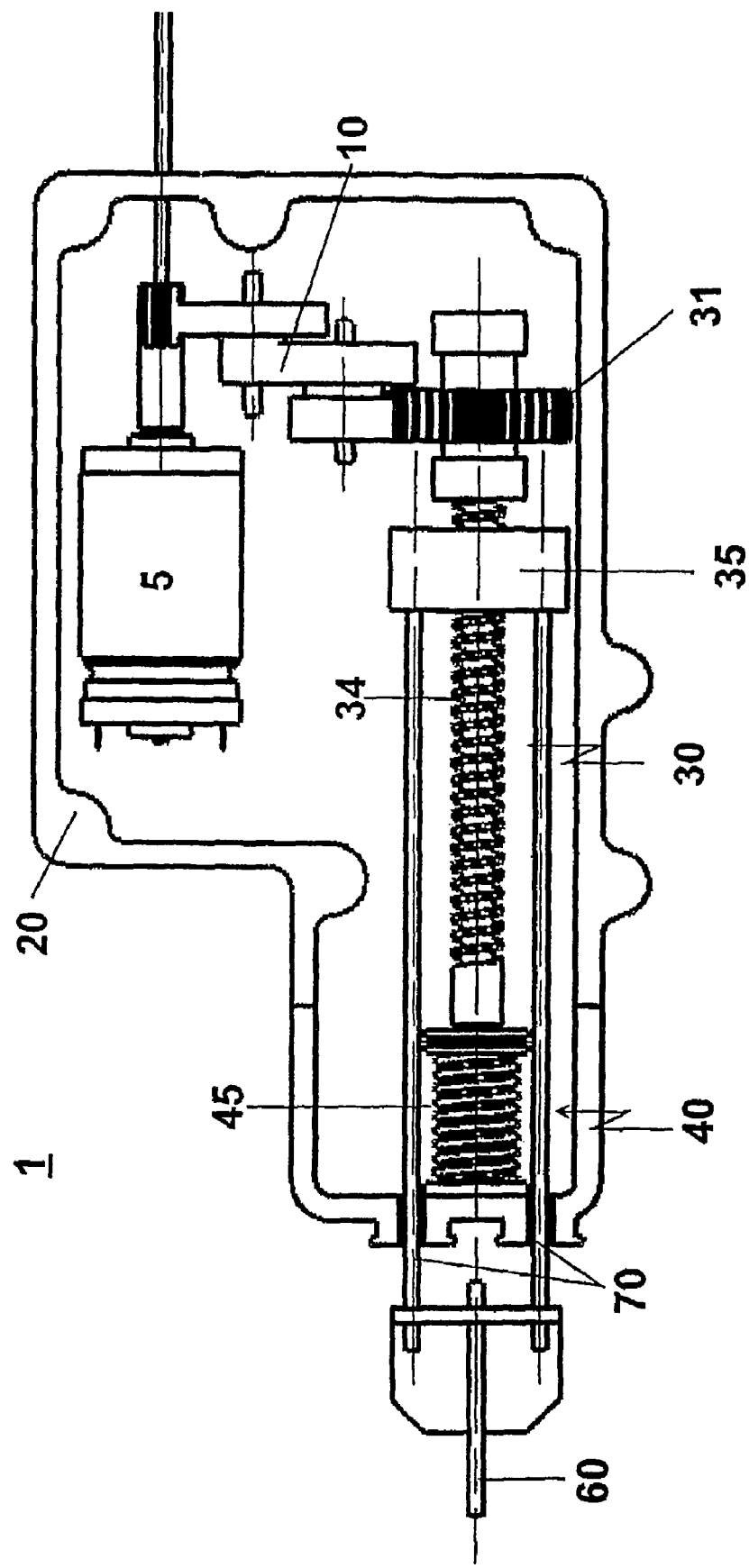
FIG. 3 a top view of the electric operating mechanism according to a first embodiment of the invention wherein the brakes (not shown) are in an applied condition.
Figure 4:
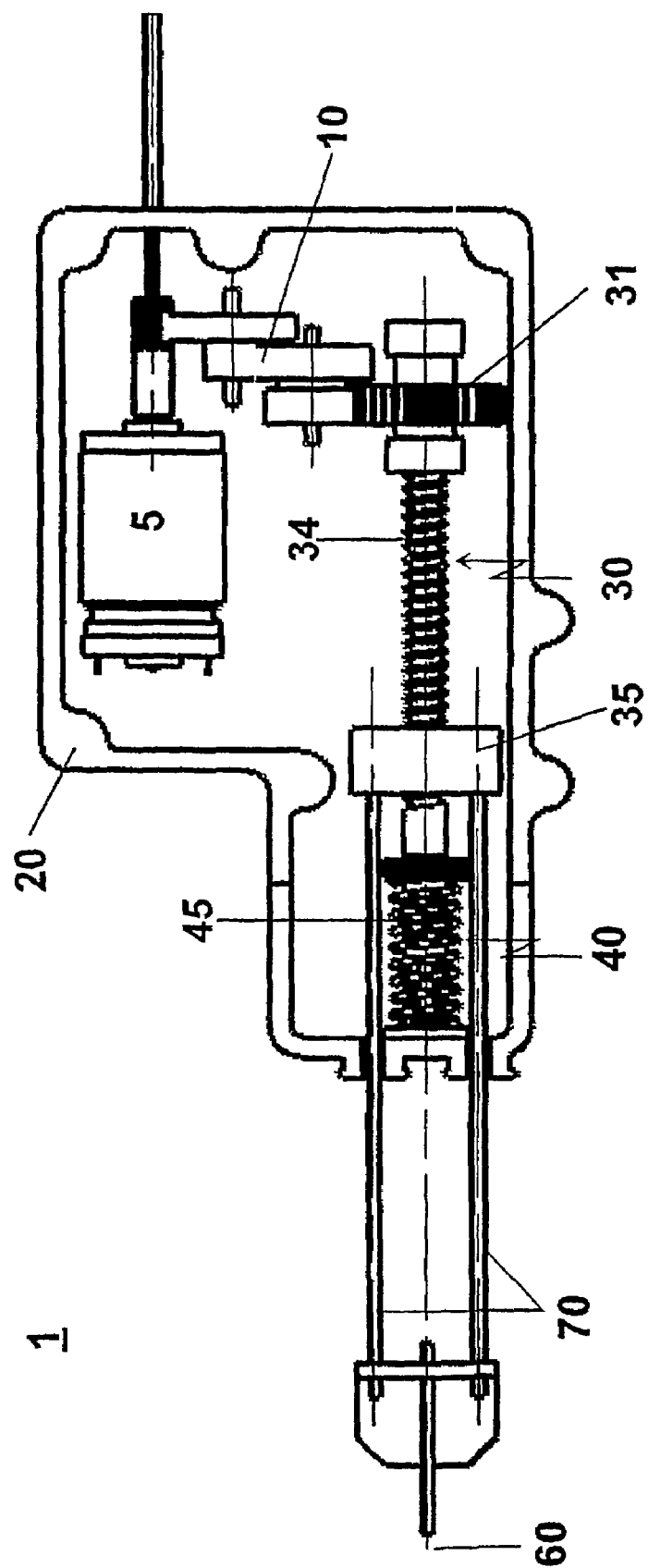
FIG. 4 a top view of the electric operating mechanism according to a first embodiment of the invention wherein the brakes (not shown) are in a released condition.

The state of applied brakes in the operating mechanism 1 is depicted in FIG. 3 while FIG. 4 shows the state of released brakes in the operating mechanism 1. In comparison to FIG. 4, the nut 35 is axially displaced in direction of the gear wheel 31 in FIG. 3 whereby the actuator 30 is shortened and the at least one brake cable 60 is applied. Based on the mechanical tensile loading of the brake cable 60 which acts on the spring 45 of the load sensor 40 as a pressure load, the spring 45 is compressed since the spindle 34 can be displaced in direction of the load sensor 40. For this reason, the spring 45 is shorter in FIG. 3 than in FIG. 4. When the brake cable 60 is released, the spring 45 expands and the spindle 34 is correspondingly displaced in direction of the gear wheel 31.

Within the load sensor 40, the length change of the spring 45 based on the axial displacement of the spindle 34 is used. The load sensor 40 comprises adjacent to the spring 45 a Hall-chip 41 and a magnet 43 which are displaced with respect to each other and against the load of the spring 45. Dependent on the distance variation between the Hall-chip 41 and the magnet 43, the varying magnetic field generates an electric signal in the Hall-chip 41 which is calibrated on the load of the compressed spring 45 whereas the force of the spring 45 represents the mechanical load of the at least one brake cable 60 as already mentioned above. To this end, the Hall-chip 41 is contained in a fixing 42 which is mounted on a housing 20 of the operating mechanism 1.

Figure 5:
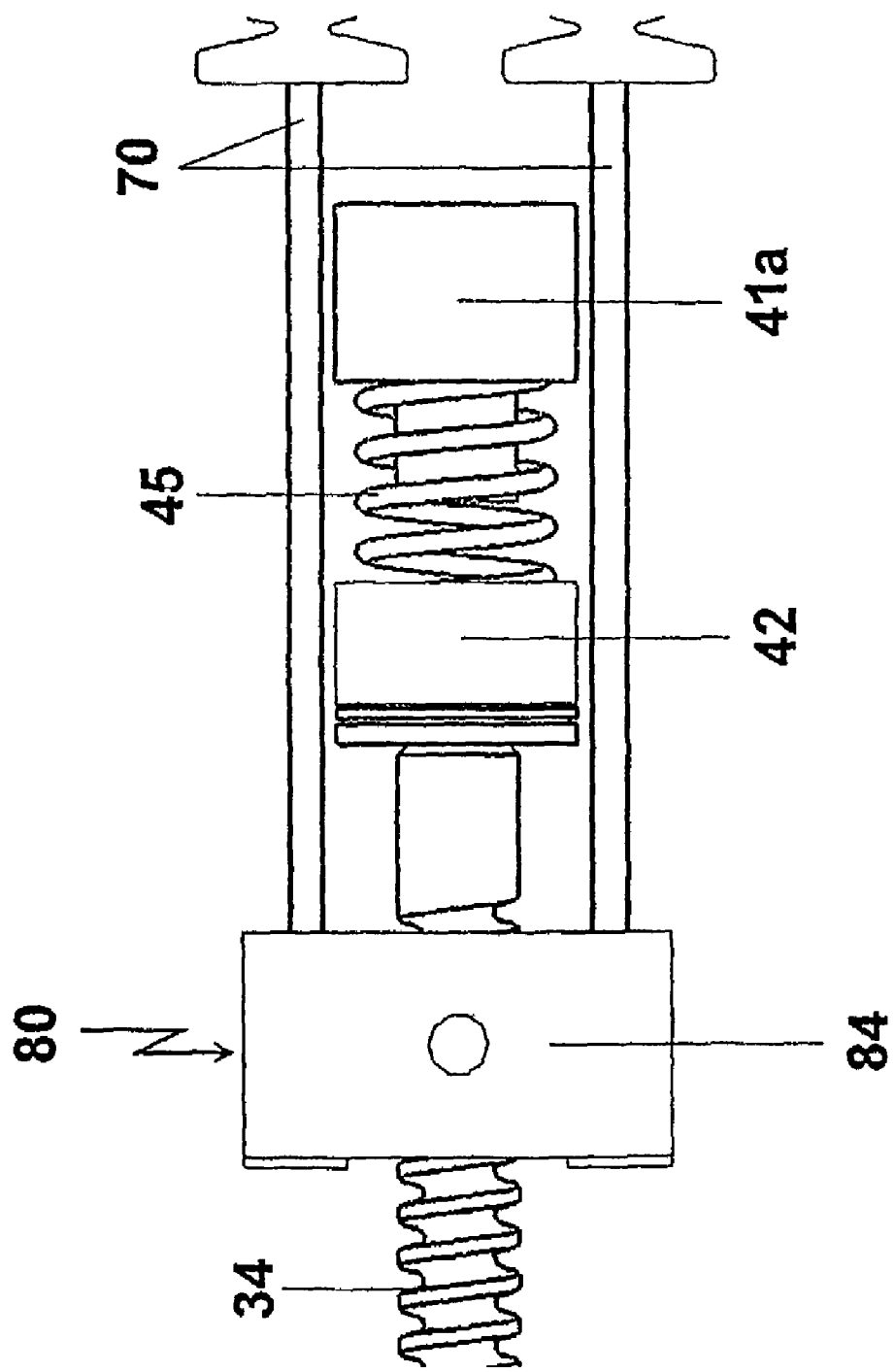
FIG. 5 a top view of the electric operating mechanism having a preferred coupling mechanism according to a further embodiment of the invention.

In the above-described preferred embodiment of the present invention, one brake cable 60 and the respective brake is operated by means of the operating mechanism 1. FIG. 5 shows a further preferred embodiment of the operating mechanism 1 which is used for the operation of two brake cables 70 at the same time. To this end, a coupling mechanism 80 being similar to the nut 35 is guided on the spindle 34. The coupling mechanism 80 comprises a nut with an arc-shaped outer surface on which a moveably slewable lever 84 is mounted. The nut with arc-shaped outer surface comprises an inner thread being complementary shaped to the thread of the spindle 34. In the same distance from the center of the nut with arc-shaped outer surface, mounting facilities are arranged on both ends of the lever 84 on which a brake cable 60 is mounted, respectively. If the brake cables 60 are of different lengths or if they develop a different length because of a different strain behavior, the lever 84 slews so that the mechanical loads generated by the operating mechanism 1 are uniformly distributed on the brake cables 60 and the respective brakes in spite of the present differences in length of the brake cables 60. According to a further embodiment, it is also possible to movably mount the lever 84 in a different way on said above described nut 35 and, thus, a simpler shape of said nut 35 can be used. Based on this inventive arrangement, it is possible to use the operating mechanism 1 for the simultaneous operation of two brake cables 60 and the corresponding brakes. In this context, it is also conceivable to configure the coupling mechanism 80 capable to operate four brake cables. Additionally, a compact arrangement is provided which as a whole can be installed in the housing 20 and which is thus protected from outer influences.

Dependent on the length strain of the brake cables 60, on their different length adjustment and on the wear of, for instance, the brake lining, the nut 35 or the coupling mechanism 80 is displaced to different positions in direction of the gear wheel 31 for the generation of the same braking force. In case of a strong wear of the brake lining, the distance to the gear wheel 31 is, for instance, the smallest. In order to indicate this wear state, for instance, microswitches can be mounted on the edge of the gear wheel 31 opposite to the spindle 34 which are operated by the nut 35 or the coupling mechanism 80 in the special case. It is also conceivable, to mount these microswitches in appropriate distances on the housing 20 or on the spindle 34 so that they are also switched there by the nut 35 or the coupling mechanism 80.

Figure 6:
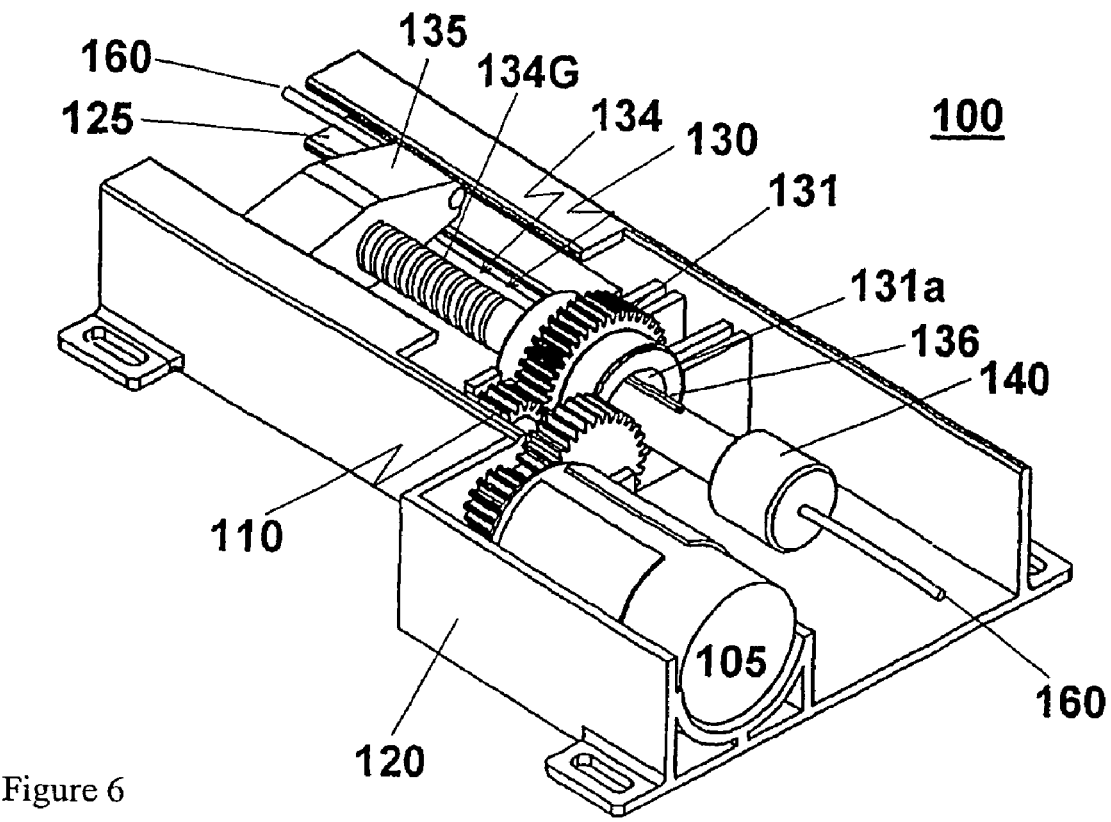
FIG. 6, 7 a perspective view of a further preferred embodiment of said operating mechanism.

A further embodiment of the present invention is shown in FIG. 6. The depicted operating mechanism 100 for a parking brake is accommodated in a housing 120. It comprises an actuator 130 which is driven by an electric motor 105 via a gear 110. The gear 110 can be comprised of one or several gear wheels dependent on which torque should be transmitted or which rotation speed should be achieved. Said gear 110 transmits the rotation of said electric motor 105 to a gear wheel 131 which comprises a concentric opening 131a. Said concentric opening 131a of said gear wheel 131 shows a certain profiled shape so that the rotation of said gear wheel 131 can be transmitted to a spindle 134 by means of said profiled opening.

The spindle 134 and a nut 135 preferably form the actuator 130. The actuator 130 is featured in that it varies its length dependent on the transmitted rotation. Said length variation is either realized by screwing said spindle 134 in said nut 135 or by screwing said spindle 134 out of said nut 135.

Figure 7:
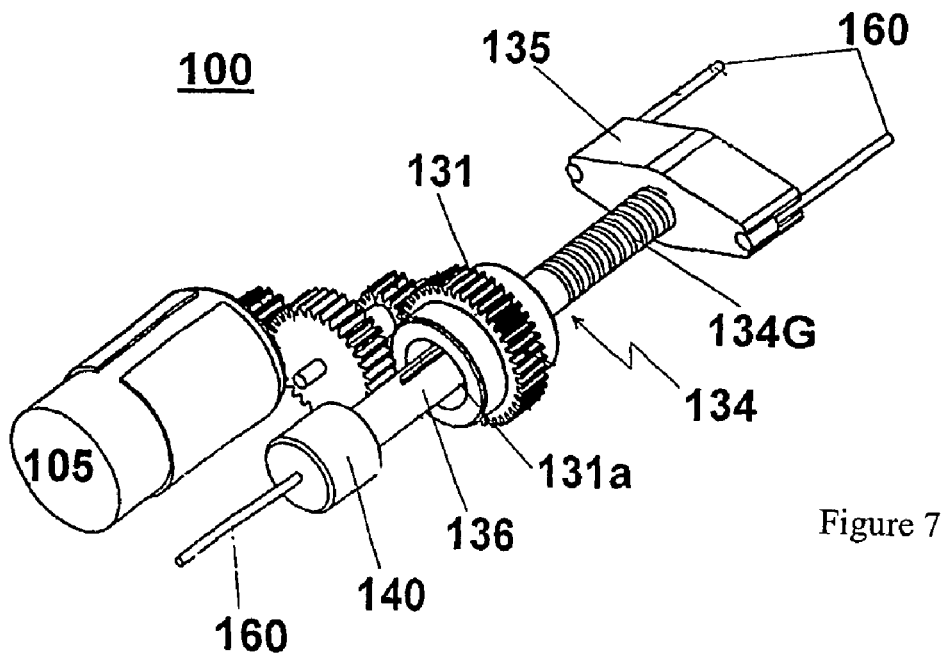

In order to realize this length variation of said actuator 130 dependent on the transmitted rotation, said spindle 134 comprises at least in a sub-portion a thread 134G, see FIG. 7. This thread 134G is complementary shaped to the inner thread of the nut 135 so that said nut 135 can be screwed on this part of the spindle. In order to prevent that said nut 135 is completely screwed from said spindle 134, said spindle 134 comprises a stopper at the end of the spindle 134 directed to the thread 134G. Furthermore, said spindle 134 comprises subsequent to said thread 134G a guiding portion 136 which serves for the guiding of said spindle in said concentric opening 131a of said gear wheel 131. The spindle 134 in this guiding portion 136 is complementary shaped to the shape of the concentric opening 131a in the gear wheel 131. In this manner, the spindle 134 and the gear wheel 131 are positively connected to each other so that on the one hand the transmission of the rotation of the gear wheel 131 to the spindle 134 is enabled and on the other hand a displacement of the spindle 134 in axial direction of said spindle 134 is guaranteed. Preferred profiles for the concentric opening 131a in said gear wheel 131 and for the guiding portion 136 of the spindle 134 are angular profiles as for example a square or a hexagon, or a rib on the guiding portion 136 which projects in a corresponding recess in the concentric opening 131a of the gear wheel 131, or the assembly of the rib inside the concentric opening 131a and the assembly of the recess within the guiding portion 136 of the spindle 134.

Further, the end of the guiding portion 136 directed away from the thread 134G of the spindle 134 serves for the mounting of at least one brake cable 160. In order to appropriately connect the spindle 134 with at least one brake cable 160, said guiding portion 136 can be configured in elongated shape or it can comprise a suitable fitting. Additionally, a load sensor 140 can be arranged between the guiding portion 136 and the end of the brake cable 160 to be connected, by means of which the mechanical load of the brake cables 160 connected to the actuator 130 is determined. In this preferred embodiment, the signal from the load sensor 140 is used to control the operations of the electric motor 105.

As already described above, a nut 135 is guided on the thread 134G of the spindle 134. This nut 135 serves for the mounting of at least one further brake cable 160. It is also conceivable that several brake cables 160 or brake cable-like intermediate connections are mounted on the nut 135. The nut 135 is configured in such a way that it can be guided in the housing 120 of the operating mechanism 100 so that its rotation is prevented. In a preferred embodiment, thus, opposite lateral portions of the nut 135 are guided in track-like displacement portions 125 of the housing 120. The displacement portions 125 allow a linear displacement of the nut 135 in an axial direction of the spindle 134 based on their shape. Therefore, the displacement portions 125 form a positive connection with the nut 135. It is also conceivable to provide these displacement portions 125 in a different shape as long as the linear motion of the nut 135 in the direction of the spindle axis is guaranteed. In this context, it is, for example, conceivable that the nut 135 comprises a projection on its bottom side (not shown) which is guided in a recess in the housing 120. In this manner, on the one hand, the rotation of the nut 135 is prevented and, on the other hand, the linear displacement of the nut 135 in the direction of the spindle axis is guaranteed.

As already mentioned above, the guiding portion 136 of the spindle 134 and the nut 135, respectively, are connected to at least one brake cable 160. Thus, the distance between the two ends of the brake cables 160 is determined by the distance between the guiding portion 136 and the nut 135. Furthermore, the spindle 134 can be axially displaced within the concentric opening 131a of the gear wheel 131 while at the same time the rotation of the gear wheel 131 can be transmitted to the spindle 134.

In case the gear wheel 131 is rotated in such a way that the spindle 134 is screwed in the nut 135 or the nut 135 is screwed on the spindle 134, the actuator 130 shortens. This means at the same time that the distance between the brake cables 160 mounted on the actuator 130 decreases so that said brake cables 160 are subjected to tensile loads. Since the spindle 134 in this concentric opening 131a of the gearwheel 131 is linearly displaceable, the tensile load generated by the shortening of the actuator 130 is uniformly distributed to the brake cables 160 connected to the actuator 130. The loading of the brake cable 160 is preferably determined by means of the intermediately arranged load sensor 140 so that an overload of the operating mechanism 100 or the brake cables 160 can be prevented.

In case the gear wheel 131 rotates in opposite direction as described above, the spindle 134 is screwed out of the nut 135. In this manner, the actuator 130 elongates which leads to the reduction of the tensile loads in the connected brake cables 160.

While the rotation of the gear wheel 131, the nut 135 is displaced in the displacement portions 125 independent of the rotation direction. At the same time, the guiding portion 136 of the spindle 134 is displaced within the concentric opening 131a of the gear wheel 131. By this arrangement, a uniform operation of at least two brake cables 160 is realized in an effective and space saving way using only a few parts.

According to a further preferred embodiment of the present invention, the operating mechanism 1, 100 is equipped with an emergency system (not shown). Said emergency system serves for applying or releasing the breaks connected to the operating mechanism 1, 100 in case of a motor or a gear failure. This motor failure can be caused by an inner defect or a failure in the power supply of said motor 5, 105 which respectively prevent its further operation.

Said emergency system is preferably formed by a manually installable ratchet which is connected via a tool to one end 34a of said spindle 34, 134. Such a tool is, according to a preferred embodiment of the present invention, a wrench or a socket wrench used in connection with said ratchet. It is a main technical feature of the above tool to be connectable to the end 34a of the spindle 34, 134 to transmit a rotation of said ratchet to said spindle 34, 134. Preferably, a positive connection is realized between said tool and said spindle 34, 134 wherein also non-positive connections can be used based on the skilled person's knowledge.

In view of the first preferred embodiment of the present invention, the end 34a of said spindle 34 preferably comprises a suitably shaped hole (not shown) which is engaged by said tool to establish a positive connection while using the emergency system. According to a preferred embodiment, said hole is formed adjacent said stopper 34c. In view of the preferred embodiment according to the invention shown in FIG. 7, said hole is provided in the spindle face near the spindle portion with thread 134G.

The connection between the spindle 34, 134 and said tool is preferably achieved through a corresponding hole in the housing 20, 120 of said operating mechanism 1, 100. In an emergency case, said tool can be inserted through said hole in said spindle 34, 134. Then, said spindle 34, 134 is rotated by means of said ratchet in the corresponding direction so that the connected brakes are applied or released. Based on the direct connection between said spindle 34, 134 and said tool with ratchet, fewer turns of said tool are necessary compared to the number of turns of the motor axle for achieving the same actuation of the brake cables connected to said operating mechanism 1, 100.

List of Reference Signs

| | |
|---|---|
| 1, 100 | operating mechanism |
| 5, 105 | electric motor |
| 10, 110 | gear |
| 20, 120 | housing |
| 30, 130 | actuator |
| 31, 131 | gear wheel |
| 31a, 131a | concentric opening in the gear wheel |
| 34, 134 | spindle |
| 34a | profiled first end of the spindle |
| 34b | second end of the spindle |
| 34c | stopper |
| 34d | rotation-decoupled stopper |
| 34G, 134G | thread of the spindle 34 |
| 35, 135 | nut |
| 40, 140 | load sensor |
| 41 | Hall-chip |
| 42 | Hall-chip fixing |
| 43 | magnet |
| 43a | magnet fixing |
| 45 | spring |
| 60, 160 | brake cable |
| 70 | Bowden cables |
| 80 | coupling mechanism |
| 84 | movable lever |
| 125 | displacement portion |
| 136 | guiding portion |

What is claimed is:

1. An operating mechanism for at least one brake, comprising:

an actuator connected to at least one brake cable; a stationary electric motor for driving the actuator; and a load sensor for determining a mechanical load of the at least one brake cable; the actuator comprising a spindle and a nut engaging each other and forming a spindle/nut assembly, wherein the spindle/nut assembly can be axially displaced within the operating mechanism, the load sensor is arranged between a housing of the operating mechanism and the spindle/nut assembly and the spindle/nut assembly bears against the load sensor such that the displacement necessary for determining the load is carried out by the spindle/nut assembly, and the spindle/nut assembly compresses the load sensor.

2. The operating mechanism according to claim 1, characterized in that said actuator is driven by an electric motor via a gear.

3. The operating mechanism according to claim 1, characterized in that said actuator changes position in a direction dependent on the mechanical load of the at least one brake cable.

4. The operating mechanism according to claim 1, characterized in that said actuator comprises a gear wheel.

5. The operating mechanism according to claim 4, characterized in that a first end of said spindle being complementary shaped to a concentric, profiled opening of said gear wheel and being guided therein so that a rotation of the gear wheel is transmitted to said spindle and that at the same time a displacement of said first end of said spindle is possible in axial direction within said concentric, profiled opening of said gear wheel.

6. The operating mechanism according to claim 5, characterized in that said first end of said spindle comprises a stopper so that said spindle cannot be completely removed from said concentric, profiled opening of said gear wheel.

7. The operating mechanism according to claim 6, characterized in that said spindle comprises a second end on which a rotation-decoupled stopper is mounted.

8. The operating mechanism according to claim 7, characterized in that said rotation-decoupled stopper comprises a magnet fixing with a magnet.

9. The operating mechanism according to claim 8, characterized in that a Hall-chip in a Hall-chip fixing is arranged opposite of and spaced apart from said magnet wherein a spring is positioned between said magnet fixing and said Hall-chip fixing.

10. The operating mechanism according to claim 4, characterized in that said nut is guided on a thread of said spindle by a respective inside thread.

11. The operating mechanism according to claim 10, characterized in that two Bowden cables are coupled to said nut via coupling facilities being symmetrically arranged to said spindle wherein said Bowden cables are connected to said at least one brake cable.

* * * * *